United States Patent [19]

Kittle et al.

[11] 4,209,984
[45] Jul. 1, 1980

[54] HYDRAULIC SYSTEM WITH UNLOADING VALVE ASSEMBLY

[75] Inventors: Carl E. Kittle; Richard A. Wittren, both of Cedar Falls, Iowa

[73] Assignee: Deere & Company, Moline, Ill.

[21] Appl. No.: 953,579

[22] Filed: Oct. 23, 1978

[51] Int. Cl.² ........................ F15B 11/16; F15B 21/04
[52] U.S. Cl. ........................................ 60/328; 60/454; 60/430; 60/464; 60/484; 417/286
[58] Field of Search ............... 417/286, 287, 288, 253, 417/63; 60/428, 430, 453, 328, 427, 454, 464, 484

[56] References Cited

U.S. PATENT DOCUMENTS

| | | | |
|---|---|---|---|
| 3,520,322 | 7/1970 | Kaptur | 60/397 X |
| 3,973,398 | 8/1976 | Kittle | 60/427 |
| 4,170,113 | 10/1979 | Kittle et al. | 60/427 |

Primary Examiner—Richard E. Gluck

[57] ABSTRACT

A hydraulic system having a reservoir fed charge pump supplying pressurized fluid through a charge passage and a filter to the inlet of a supply pump for direction controlled fluid devices includes a reservoir connected unloading valve assembly connected to the charge passage and parallel with the filter. The fluid devices return fluid through a return passage connected to the unloading valve assembly which maintains back pressure on the devices at charge passage pressure. The unloading valve assembly includes an unloading valve movable in response to a predetermined fluid pressure at the inlet of the supply pump to unload the charge and return passage by connecting them to the reservoir. As the devices require more fluid from the supply pump causing the pressure at the inlet of the supply pump to drop, the unloading valve proportionately blocks the charge and return passages from the reservoir to circulate return fluid into the charge passage. The unloading valve assembly further includes a signal valve which responds to a predetermined pressure differential across the filter to provide a signal indicative of a clogged filter and to cause the unloading valve to connect both the charge and return passages to the reservoir in such a situation.

6 Claims, 1 Drawing Figure

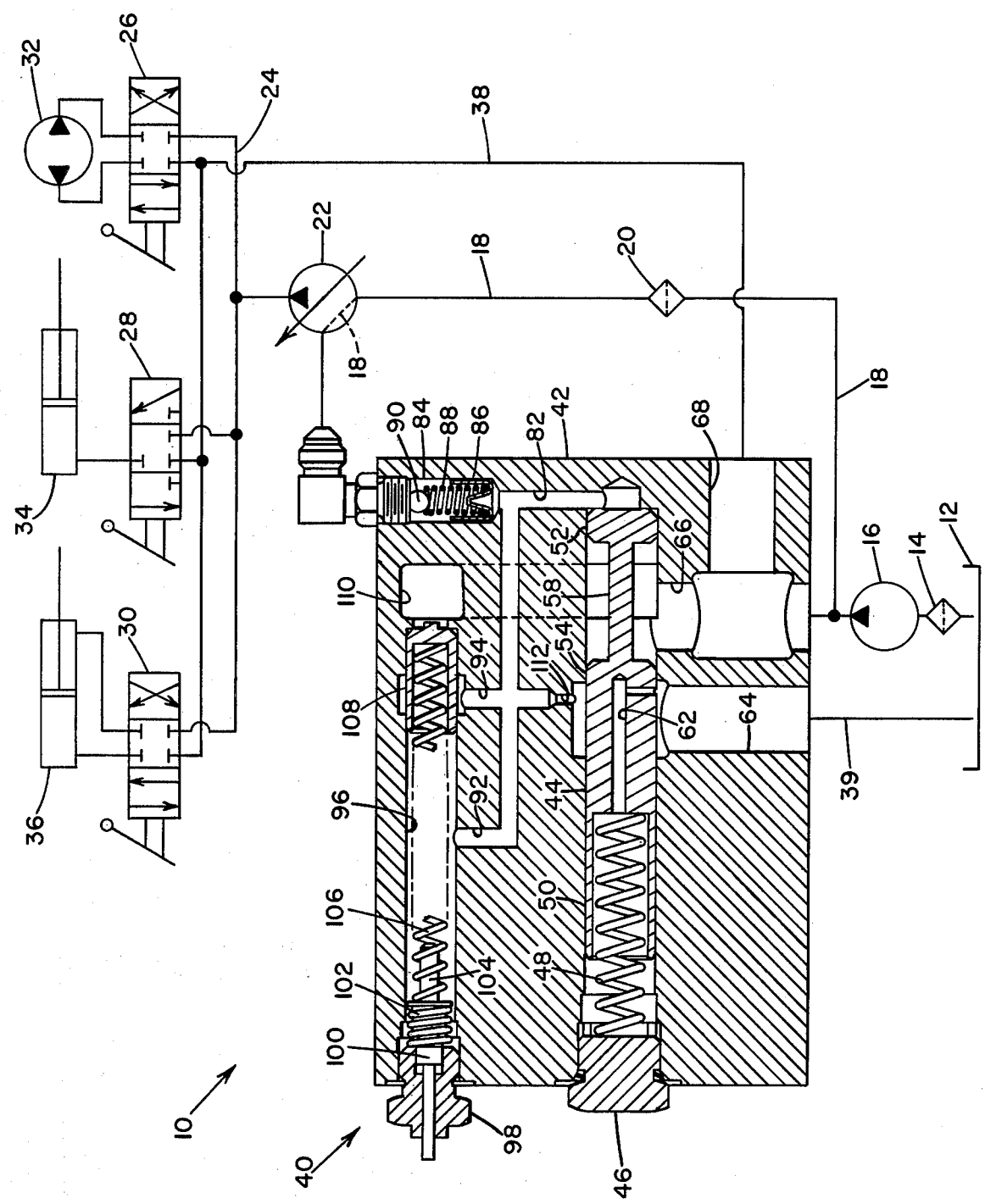

HYDRAULIC SYSTEM WITH UNLOADING VALVE ASSEMBLY

BACKGROUND OF THE INVENTION

In the past, a direction control valve was used which was operative to automatically direct the return fluid of a single acting function to the fluid reservoir and to direct the return fluid of continuously acting and/or double acting functions to a charging circuit for the supply pump as described in the U.S. Pat. No. 3,973,398 granted to C. E. Kittle on Aug. 10, 1976.

An accepted disadvantage of the prior art is that the return fluid of continuously acting and/or double acting functions must be at the maximum charge circuit pressure during operation of any of these functions so that the return fluid can provide the bulk of the fluid feeding the supply pump. Since the useable pressure for a function is the difference between its supply and return pressures, it is evident that a power penalty exists in the form of the difference between reservoir and return pressures. Where it has been desired to increase function power output without increasing the size of the function device itself, those skilled in the art have increased the supply pressure by providing a larger pump with the acceptance of this power penalty.

SUMMARY OF THE INVENTION

The present invention provides an unloading valve added to the charge circuit of a high pressure hydraulic system. This valve routes all flow from the single acting, double acting, and/or continuously acting devices or functions as well as the charge pump directly to the reservoir when the pressure at the inlet of the supply pump is above a predetermined level. As the pressure drops because of usage at the various functions, the pressure drops causing the valve to route more fluid from the charge and then return passages to the supply pump to return the pressure to the predetermined level. As all functions begin to operate, the valve will operate to block the charge and return passages from the reservoir.

The present invention further provides signal valving incorporated into this unloading valve assembly which is responsive to the pressure differential across a filter disposed between the charge and supply pump to provide a signal indicative of the clogging of the filter. The signal valving further operates to connect the charge pump directly to the reservoir when the filter is clogged.

The present invention still further provides cold weather protection by providing for continuous circulation of return fluid whenever the charge pump has difficulty providing enough pressurized fluid for the supply pump.

The present invention still further provides for lower standby losses because lower system pressures can be used to provide the same power output.

The above and additional advantages of the present invention will become apparent to those skilled in the art from a reading of the following detailed description when taken in conjunction with the accompanying drawing.

BRIEF DESCRIPTION OF THE DRAWING

The drawing is a schematic illustration partially in section of the hydraulic system of the present invention.

DESCRIPTION OF THE PREFERRED EMBODIMENT

Referring now to the drawing, therein is shown a hydraulic system 10 which includes a fluid reservoir 12 containing fluid to be drawn through a charge pump filter 14 by a charge pump 16. The charge pump 16 is connected to a charge passage 18 which has disposed therein a main filter 20. The charge passage 18 is further connected to a supply pump 22 which in addition to internally carrying the charge passage 18 supplies high pressure fluid to a supply passage 24.

The supply passage 24 is connected to a series of direction control valves 26, 28, and 30 which in the preferred embodiment are respectively connected to a reversible hydraulic motor 32, a single acting cylinder 34, and a double acting cylinder 36. The direction control valves 26, 28, and 30 are further connected to a return passage 38.

The return passage 38 is connected to an unloading valve assembly 40 which is connected to the charge passage 18 in parallel with the main filter 20 and which is further connected to the reservoir 12 by a reservoir passage 39.

The unloading valve assembly 40 includes a valve body 42 having an unloading valve bore 44 which is plugged at one end by a plug 46 against which is seated a spring 48. The spring 48 biases an unloading valve spool 50 against the far end of the unloading valve bore 44. For convenience, the convention will be used that the viewer's right will be considered the right side of the valve and the viewer's left will be considered the left, thus it will be seen that the unloading valve spool 50 abuts the right end of the unloading valve bore 44.

The unloading valve spool 50, starting from the right has first and second lands 52 and 54 separated by a groove 58. A passage 62 is disposed through the unloading valve spool 50 so as to connect the left or spring side of the unloading valve spool 50 to a reservoir passageway 64 which is connected to the reservoir passage 39. Parallel to and adjacent the reservoir passageway 64 is a main passageway 66 which connects the unloading valve bore 44 to the charge passage 18. A return passageway 68, connected to the return passage 38, intersects the main passageway 66 between the charge passage 18 and the unloading valve bore 44.

The right end of the unloading valve bore 44 is connected to a check valve passageway 82 which is connected to a check valve 84. The check valve 84 contains a conventional retainer 86, a spring 88, and a ball 90 to allow flow from the charge passage 18 to the check valve passageway 82 and prevent flow in the reverse direction. The check valve 84 thus eliminates the possibility of unfiltered fluid being drawn into the supply pump 22.

The check valve passageway 82 is connected to first and second passageways 92 and 94 which are spaced apart and connected to a signal valve bore 96 provided in the valve body 42. The signal valve bore 96 is plugged at one end by a plug 98 which includes a sealed signal plunger 100. Abutting the plug 98 is a spring 102 which abuts a spacer pin 104. The spacer pin 104 further abuts a spring 106 which biases a signal valve spool 108 against the right end of the signal valve bore 96. The right end of the signal valve bore 96 is further connected by a signal passageway 110 to the unloading valve bore 44 and thence to the main charge passageway 66.

The first and second passageways 92 and 94 and the check valve passageway 82 are commonly connected by an orifice 112 to the reservoir passageway 64.

During operation of the hydraulic system 10, when all the direction control valves 26, 28, and 30 are in the closed position shown, the charge pump 16 will provide pressurized fluid to the charge passage 18 which will be at a predetermined standby pressure level maintained by the restriction of flow through the check valve 84 and the orifice 112. The pressure in the charge passage 18 at the inlet of the supply pump 22 is transmitted through the check valve 84 and the check valve passageway 82 to impart a pressure to the right hand end of the unloading valve bore 44 which shifts the unloading valve spool 50 to its extreme left hand position so as to compress the spring 48.

With the unloading valve spool 50 in its left hand position, the main passageway 66 and thus the charge and return passages 18 and 38 are connected to the reservoir passageway 64 by the groove 58. In this position, the low pressure return fluid from the direction control valves are connected directly to the reservoir 12 and only that fluid from the charge pump 16 necessary to maintain the standby pressure required at the supply pump 22 is provided thereto with the remainder being diverted through the main passageway 66 into the reservoir 12.

As one of the functions starts to draw fluid from the supply pump 22, as for example the reversible hydraulic motor 32, the pressure of pressurized fluid at the inlet of the supply pump 22 will be slightly reduced. This reduction below the predetermined standby pressure level causes a reduction in the pressure in the check valve passageway 82 and causes movement of the unloading valve spool 50 to the right. This movement causes a metering of fluid from the main passageway 66 across the land 54 of the unloading valve spool 50 and causes a corresponding increase in the pressure in the charge passageway 18 to counteract the reduction caused by the draw from the supply pump 22. At this point, all of the return fluid and most of the charge fluid will be flowing to the reservoir 12.

As more fluid is required from the supply pump 22, as for example if the double acting cylinder 36 as well as the reversible hydraulic motor 32 were in operation, the pressure of pressurized fluid at the inlet of the supply pump 22 would be further reduced causing the pressure in the right hand end of the unloading valve bore 44 to decrease to the point where the land 54 of the unloading valve spool 50 would cause the full output of the charge pump 16 to be inputted to the charge passage 18.

As the full output of the supply pump 22 is required with all functions in operation, as for example when both single and double acting cylinders 34 and 36 as well as the reversible hydraulic motor 32 are in operation, the pressure of pressurized fluid in the charge passage 18 will be reduced past a predetermined minimum pressure level. The reduction of pressure in the charge passage 18 causes the unloading valve spool 50 to move to the right causing the land 54 to block the main passageway 66 from the reservoir passageway 64. As a result of a blockage, pressure in the return passageway 68 will increase with both the charge and return passages 18 and 38 supplying pressurized fluid to the supply pump 22. As the various functions are shut down, the sequence of operation will reverse itself such that at the standby pressure level the return fluid from the direction control valves and the charge fluid will again be connected to the reservoir 12.

One additional advantage of this system, is that fluid for the most part is returned to the reservoir 12 because it is drawn up by the charge pump 16 through the charge pump filter 14 and dumped to reservoir 12 when supply pump 22 has no demand so as to prolong the filter life of the main filter 20 and provide a cleaner system.

The unloading valve assembly 40 is connected across the main filter 20 so as to be capable of providing a visual indication of when the main filter 20 is clogged as well as preventing operation of the functions when the filter is clogged. As the main filter 20 clogs, the pressure on the charge pump side increases causing the pressure in the main and signal passageways 66 and 110 to increase. At a predetermined pressure difference across the main filter 20 as sensed by the pressure in the signal passageway 110 being greater than that sensed through the first passageway 92 plus the force of the springs 102 and 106, the signal valve spool 108 moves causing the spacer pin 104 to press the signal plunger 100 to the left causing the stem of the signal plunger 100 to extend indicating that the filter is clogging. With a further increase in the pressure in the signal passageway 110, the signal valve spool 108 opens. The pressurized fluid from the signal passageway 110 is then transmitted through the first and second passageways 92 and 94 to the check valve passageway 82 causing (1) the check valve 84 to close thus preventing dirty oil from reaching the supply pump 22 and (2) the unloading valve spool 50 to move to the left to the position in which the main passageway 66 is connected to the reservoir passageway 64 by the groove 58. After the main filter 20 is cleaned, the unloading valve assembly 40 automatically resets itself for normal operation.

While the invention has been described in conjunction with a specific embodiment, it is to be understood that many alternatives, modifications, and variations will be apparent to those skilled in the art in light of the foregoing description. Accordingly, it is intended to embrace all such alternatives, modifications, and variations which fall within the spirit and scope of the appended claims.

We claim:

1. A hydraulic system comprising: a fluid reservoir; a charge pump having an inlet connected to said reservoir and an outlet for providing pressurized fluid; a charge passage connected to the outlet of said charge pump; a supply pump having an inlet connected to said charge passage and an outlet for providing high pressure fluid; a supply passage connected to the outlet of said supply pump; fluid function means having an inlet connected to said supply passage for using the high pressure fluid from said supply passage and having an outlet for exhausting low pressure fluid therefrom; a return passage connected to the outlet of said fluid function means; a valve body having an unloading valve bore provided therein with a first end connected to said charge passage proximate the inlet of said supply pump, said valve body having a main passageway provided therein connected directly to said charge and return passages and intersecting said unloading valve bore proximate said first end; said valve body having a reservoir passageway provided therein connected to said reservoir and intersecting said unloading valve bore distal from said first end; said valve body having orifice means provided therein connecting the first end of said unloading valve bore to said reservoir passageway; and an unloading valve spool disposed in said unloading valve bore and biased towards the first end thereof to block the first end from said main passageway and said main passageway from said reservoir passageway, said unloading valve spool slidable from the first end of said unloading valve bore in response to a predetermined pressure level of pressurized fluid in said charge passage, said unloading valve spool having land and groove means provided therein for selectively and meteringly blocking and connecting said main passageway from and to said reservoir passageway as said unloading valve spool slides away from the first end of said unloading valve bore whereby said unloading valve spool connects the pressurized fluid from said charge pump and the low pressure fluid from said fluid function to said reservoir when the pressurized fluid is above the predetermined pressure level and disconnects the pressurized and low pressure fluid from said reservoir when the pressurized fluid is below the predetermined pressure level to cause the low pressure fluid to add to the pressurized fluid to said supply pump.

2. The hydraulic system as claimed in claim 1 including filter means disposed in said charge passage between said charge and supply pumps in parallel with said valve body.

3. The hydraulic system as claimed in claim 1 wherein said valve body has a check valve bore provided therein having a first end connected to said charge passage proximate the inlet of said supply pump and a second end connected to the first end of said unloading valve bore, said valve body having a signal valve bore provided therein having a first and second ends with the first end of said signal valve bore connected to the main passageway, said valve body having first and second passageway means provided therein each being connected to said signal valve bore and commonly connected to the second end of said check valve bore with said orifice means connecting the first and second passageway means to said reservoir passageway; check means disposed in said check valve bore for preventing the flow of fluid from the second end of said check valve bore to the first end thereof; a signal valve spool disposed in said signal valve bore between the first end thereof and the first passageway means, said signal valve spool biased towards the first end of said signal valve bore and responsive to a predetermined pressure differential between the pressure of pressurized fluid in the main passageway and in said charge passage proximate the inlet of said supply pump to slide to connect the main passageway to the first and second passageway means whereby the main passageway is connected to the reservoir passageway by the unloading valve spool above the predetermined pressure differential; and signal means responsive to the signal valve spool sliding to provide a signal indicative thereof.

4. A hydraulic system comprising: a fluid reservoir; a charge pump having an inlet connected to the reservoir and an outlet for providing pressurized fluid; a charge passage connected to the outlet of the charge pump; a supply pump having an inlet connected to the charge passage and an outlet for providing high pressure fluid; a supply passage connected to the outlet of the supply pump; fluid function means having an inlet connected to the supply passage for using the high pressure fluid and having an outlet for exhausting low pressure fluid therefrom; a return passage connected to the outlet of the function means; a valve body having an unloading valve bore provided therein, said unloading valve bore having a first end connected to the charge passage proximate the supply pump and a second closed end; said valve body having a main passageway provided therein connected at one end to said unloading valve bore spaced from the first end thereof and connected at the other end to said charge passage, said valve body having a return passageway provided therein connected at one end to said return passage and connected at the other end to said main passageway between said unloading valve bore and said charge passage; said valve body having a reservoir passageway provided therein connected at one end to said unloading valve bore spaced from said main passageway and the first end of said unloading valve bore and connected at the other end to a reservoir passage; said valve body having orifice means provided therein connecting the first end of said unloading valve bore to said reservoir passageway; an unloading valve spool slidably disposed in the unloading valve bore normally blocking the first end of the unloading valve bore from the second end; said unloading valve spool having groove means provided therein positionable in a first position connecting the flow of low pressure and pressurized fluid from said return and charge passages to said reservoir passage, and in a second position blocking the flow of low pressure and pressurized fluid from said return and charge passage to said reservoir passage first biasing means disposed between said unloading valve spool and the second end of said unloading valve bore for normally holding said unloading valve spool in the first position and allowing said unloading valve spool to be moved to the second position in response to the pressure level of pressurized fluid in said charge passage proximate said supply pump whereby said unloading valve spool connects said charge pump and the outlet of said fluid function to said reservoir at a predetermined pressure level, and blocks said charge pump and the outlet of said fluid function from the reservoir passage below said predetermined pressure level.

5. The hydraulic system as claimed in claim 4 including a filter disposed in said charge passage between said charge and supply pumps in parallel with said valve body.

6. The hydraulic system as claimed in claim 5 wherein said valve body has a check valve bore provided therein having a first end connected to said charge passage proximate the supply pump on the charge pump distal side of said filter and a second end connected to the first end of said unloading valve bore, said valve body having a signal valve bore provided therein having a first and second ends with the first end of the signal valve bore connected to the main passageway, said valve body having first and second passageway means provided therein each being connected to said signal valve bore and commonly connected to the second end of said check valve bore with said orifice means connecting the first and second passageway means to said reservoir passageway; check means disposed in said check valve bore for preventing the flow of fluid from the second end of said check valve bore to the first end thereof; a signal valve spool disposed in said signal valve bore between the first end thereof and the first passageway means, said signal valve spool biased towards the first end of said signal valve bore and responsive to a predetermined pressure differential between the pressure of pressurized fluid in the main passageway and in said charge passage proximate the inlet of said supply pump to slide to connect the charge passageway to the first and second passageway means whereby the main passageway is connected to the reservoir passageway by the unloading valve spool above the predetermined pressure differential; and signal means abuttable by said signal valve spool when it slides to the second end of said signal valve bore to provide a signal indicative of a clogged filter.

* * * * *